March 31, 1959  G. E. COMSTOCK 3D  2,880,407
ELECTRONIC SWIVEL CONTROL
Filed Feb. 17, 1955  4 Sheets-Sheet 1
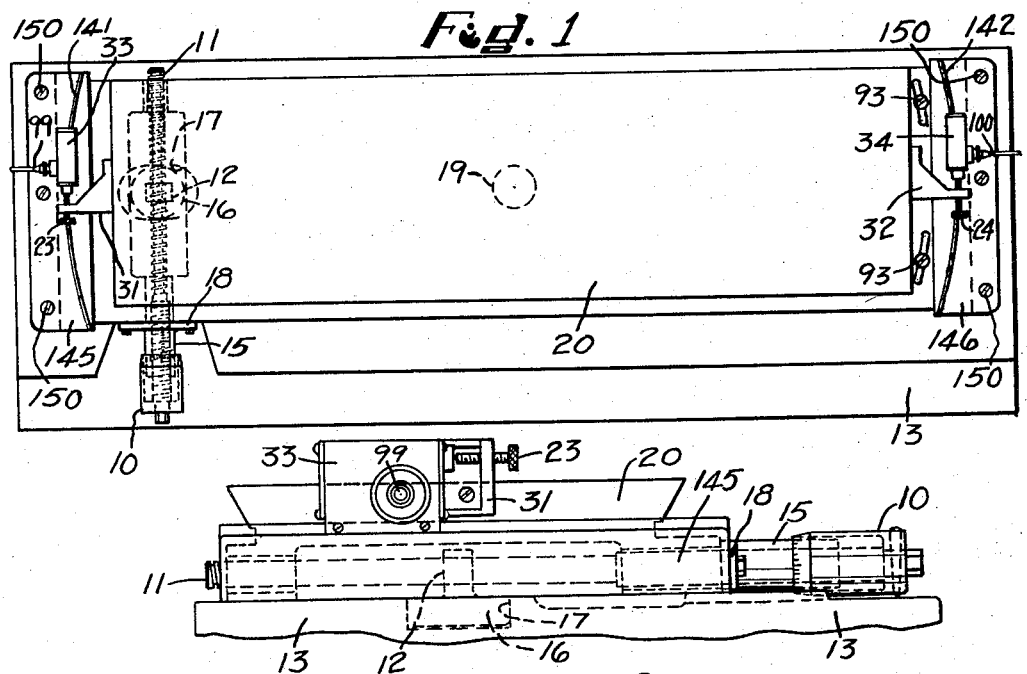
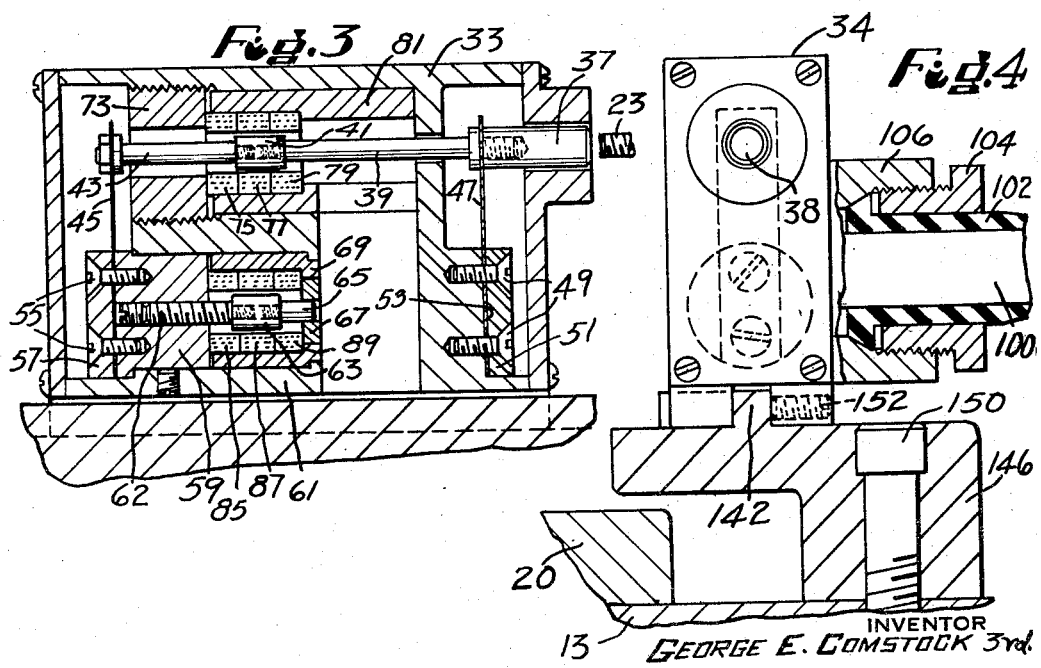
INVENTOR
GEORGE E. COMSTOCK 3rd.
BY
ATTORNEY March 31, 1959     G. E. COMSTOCK 3D     2,880,407
ELECTRONIC SWIVEL CONTROL
Filed Feb. 17, 1955     4 Sheets-Sheet 2
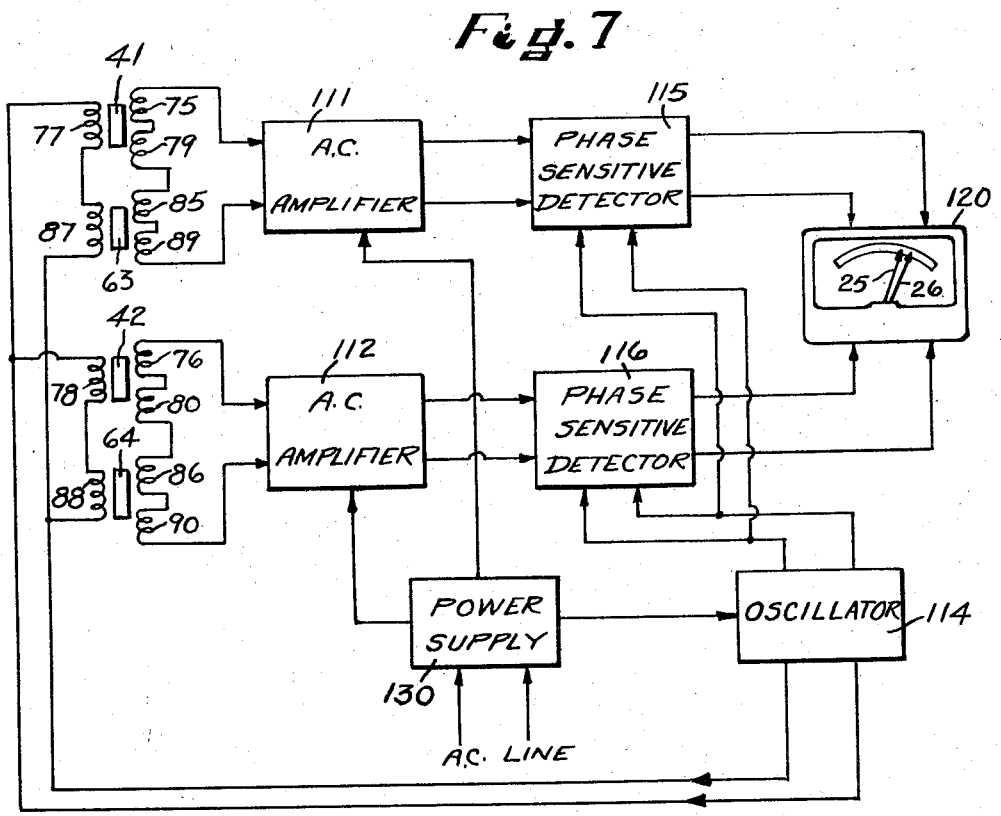
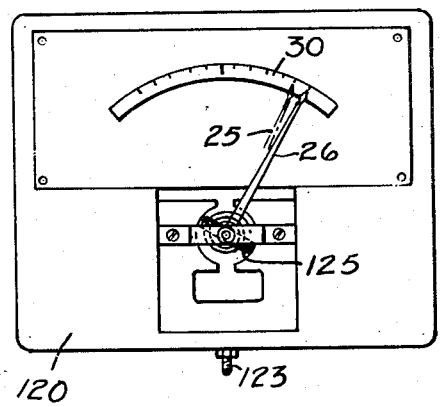
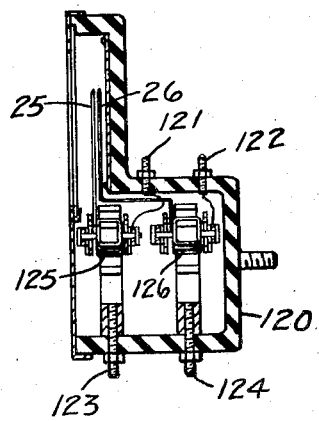
INVENTOR
GEORGE E. COMSTOCK 3rd.
BY
ATTORNEY

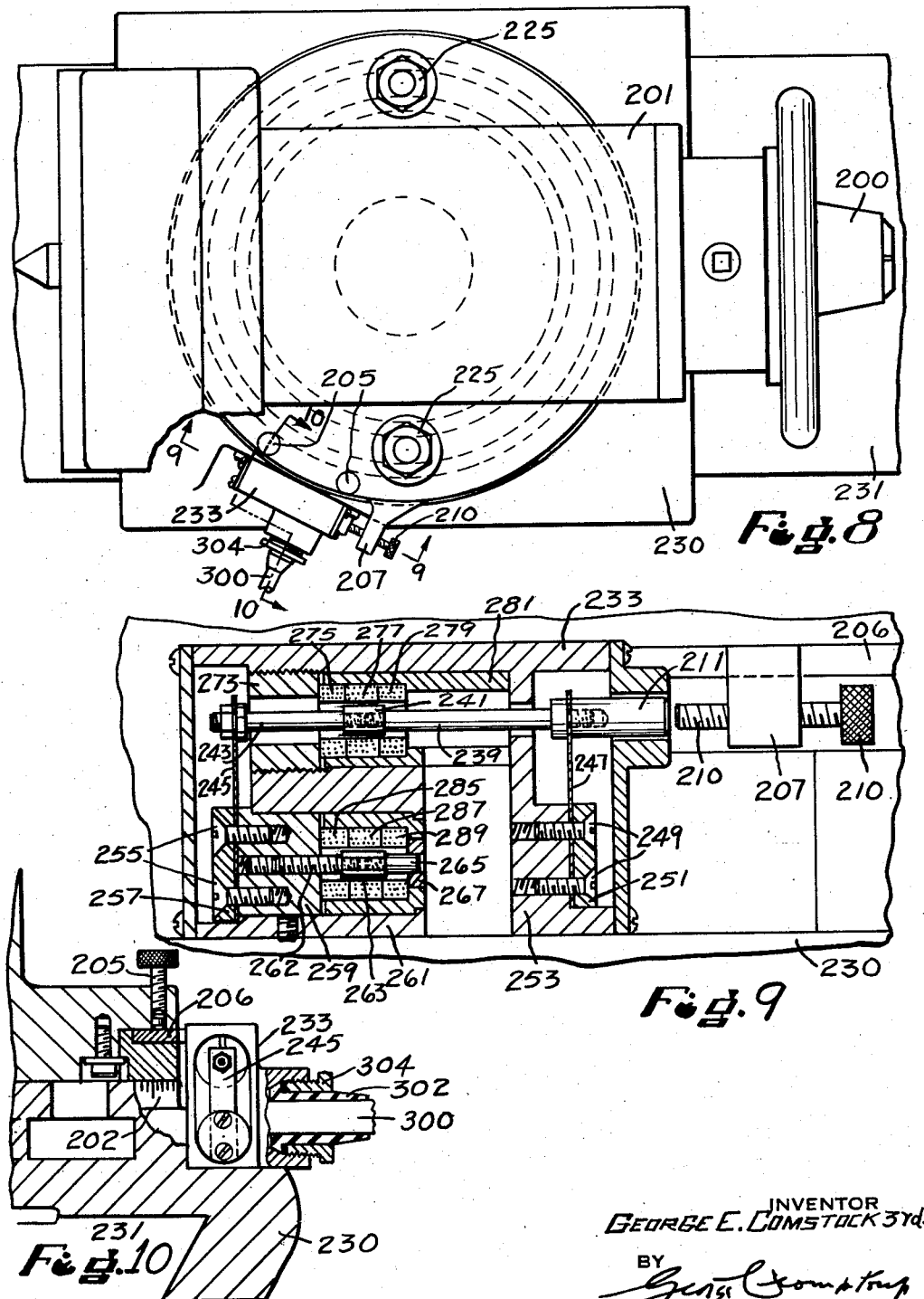

March 31, 1959  G. E. COMSTOCK 3D  2,880,407
ELECTRONIC SWIVEL CONTROL

Filed Feb. 17, 1955  4 Sheets-Sheet 4

INVENTOR
GEORGE E. COMSTOCK 3rd.
BY
ATTORNEY

United States Patent Office 2,880,407
Patented Mar. 31, 1959

2,880,407
ELECTRONIC SWIVEL CONTROL
George E. Comstock 3d, Holden, Mass., assignor to Norton Company, Worcester, Mass., a corporation of Massachusetts Application February 17, 1955, Serial No. 488,835
6 Claims. (Cl. 340—199)

The invention relates to electronic swivel controls for machine tools and the like.

One object of the invention is to provide a swivel control especially adapted to adjust a headstock accurately to a desired angle. Another object of the invention is to provide a swivel control to adjust a machine tool table accurately to a desired angle. Another object of the invention is to provide means for detecting and indicating small angular movement of one part upon another part. Another object of the invention is to provide a control indicator of the above character readily adapted to give indications in terms of taper as in thousandths or fractions of a thousandth of an inch per inch or per foot or in other systems such as the metric system. Another object of the invention is to provide duplicate indicating mechanisms, as at opposite ends of a table pivotally mounted between the ends, to correct for play in the pivot or for warpage of the table or for both. Another object of the invention is to combine the two readings in one instrument in a reliable and dependable manner so that a gross error in one instrument will readily be disclosed by the other one. Another object is to provide electrical apparatus to achieve one or more of the foregoing objects which is insensitive to changes of temperature and changes in the line voltage of the electrical input.

Other objects will be in part obvious or in part pointed out hereinafter.

Figure 13:
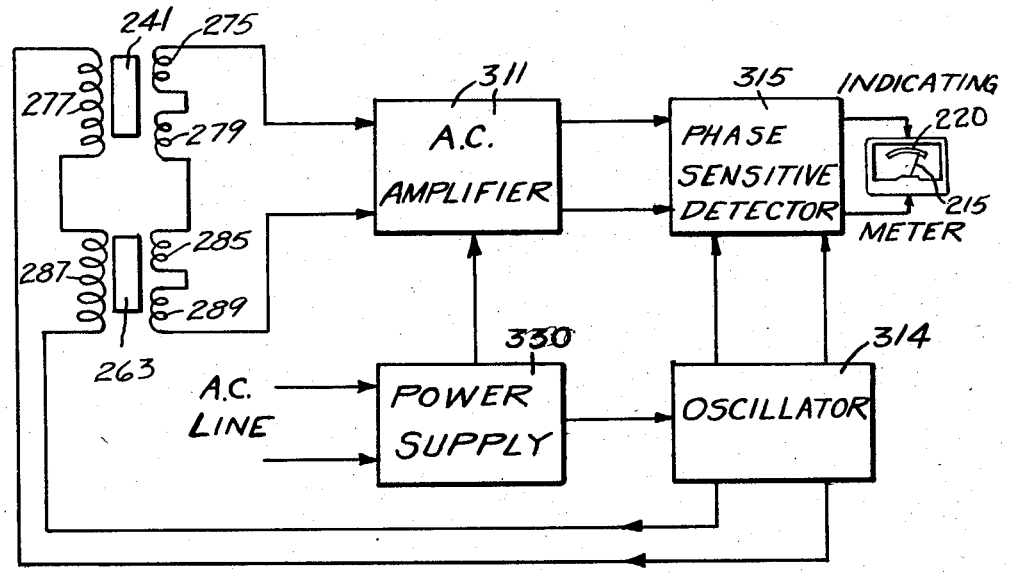
Figure 11:
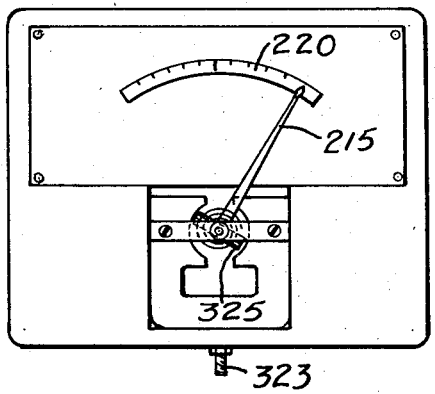
Figure 12:
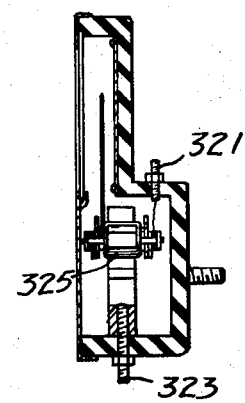

In the accompanying drawings illustrating mechanical and electronic features of the invention as applied to two different machine tool elements, Figure 1 is a plan view of the work table and underlying carriage of a grinding machine having two sets of actuating apparatus of the invention connected thereto, Figure 2 is an end elevation on an enlarged scale taken from the left hand side of Figure 1, Figure 3 is a vertical sectionay view on an enlarged scale of the linear variable differential transformers and associated parts and a box for the same, constituting the actuating unit at the left hand end of the table, Figure 4 is an elevation from the front of the machine of a unit which is the same as the unit of Figure 3 only it illustrates the unit at the right hand end of the table from the front thereof, the scale being the same as in Figure 3, these units being the same except one is the mirror image of the other, Figure 5 is a front elevation of a meter, Figure 6 is a vertical sectional view of the meter of Figure 5, Figure 7 is an electronic diagram, Figure 8 is a plan view of the headstock of a grinding machine showing the actuating part of the apparatus of the invention connected thereto, Figure 9 is a cross sectional view on an enlarged scale taken on the line 9—9 of Figure 8, Figure 10 is a cross sectional view on a scale larger than Figure 8 but somewhat smaller than Figure 9 taken on the line 10—10 of Figure 8, Figure 11 is a front elevation of a meter, Figure 12 is a vertical sectional view of the meter of Figure 11, Figure 13 is an electronic diagram.

There are two disclosures herein but they are so closely related that it is believed they constitute a single invention. The first disclosure covered in Figures 1 to 7 inclusive deals with the swivel control of a machine tool table and it could be for a machine other than a grinding machine although illustratively it is envisioned as for embodiment in a grinding machine. In the first disclosure there are two indicating actuators and two separate meter needles although the electronic arrangement could be varied to compound the signals into a single needle if desired. There are, however, some advantages in having two different needles so this is illustrated. The second disclosure covered in Figures 8 to 13 inclusive deals with the swivel control of a headstock for a machine tool or it could be for a machine other than a grinding machine although illustratively it is envisioned as for embodiment in a grinding machine.

I shall deal first with the first disclosure of Figures 1 to 7 inclusive. As conducive to a quicker understanding of the invention the modus operandi will first be dealt with. It is assumed at the outset that it is not presently possible to build an economical instrument which will permit adjustment of the swivel table to the correct taper angle in one setting. The procedure, however, for very accurately setting the table according to the present invention is quite simple and is as follows. Having mounted the workpiece on the usual instrumentalities such as a chuck or between centers, these instrumentalities being not shown, the operator turns the sleeve 10 (Figures 1 and 2) of a micrometer adjustment which has circumferentially thereabout lines representing increments of, for example, .010″ per foot taper. This sleeve is attached to a screw 11 which moves through a nut 12 pivotally mounted on the top of the machine carriage 13. The threads of the screw 11 are coarse where it passes through the nut 12 but they are fine threads in a barrel 15 which is internally threaded. The upper side of the barrel 15 has a linear scale for example marked off in increments of quarters of an inch per foot taper, as it is convenient to have 25 lines around the sleeve 10. These statements of actual calibration are of course merely illustrative and any other system can be adopted. The nut 12 has a cylindrical base 16 which is slidable in a direction parallel to the movement of the carriage 13 (parallel to its front vertical surface usually) in a closely fitting slot 17 and has parallel vertical side walls parallel to said direction of movement. This is for come and go due to the angular movement.

The barrel 15 has a flange 18 by means of which it is secured to the table 20 and it will be seen that by reason of the differential between the threads on the screw 11 rotation of the sleeve 10 and screw 11 will move the table 20 angularly relative to the carriage 13. The table 20 is pivotally mounted on the carriage 13 by means of a pivot pin 19.

The operator turns the sleeve 10 until the micrometer indicates the desired taper, the reading being in this illustrative description taper in the indicated inch measurement per foot. He then grinds the workpiece and with micrometer calipers actually measures the taper. The operator then knows that the preliminary setting is in error by just so much.

In order to make the small additional correction necessary to secure the desired taper, the operator brings into play the sensitive indicating apparatus of this invention.

If the rough initial setting did not necessitate a very large change in the angle of table 20 relative to carriage 13, knurled screws 23 and 24 (Figures 1 and 2) are turned by the operator while watching the needles 25 and 26 of the meter shown in Figures 5, 6 and 7. One knurled screw controls one needle and the other controls the other one, for example the knurled screw 23 through the electronic mechanism hereinafter described operates the needle 25 and the knurled screw 24 operates the needle 26. The operator zeros both needles and conveniently the zero position is straight up or in the middle of the dial 30 of Figure 5. The operator now knows that the electronic apparatus is set so that he can make the correction as indicated on the dial by the needles 25 and 26. For example, he may have discovered that he needs .0025" per foot less taper in apparatus where the divisions on the sleeve 10 represent increments of .010". In such a case deflection from center to full scale in either direction of the needles 25 and 26 will represent a taper change of .010" per foot, and this range can conveniently be divided into ten sub-increments.

The operator then turns the sleeve 10 until the needles 25 and 26 have moved two and a half divisions to the left on the average as he interpolates between them. I like an arrangement in which moving the table 20 clockwise moves the needles clockwise. Having two needles each operated by one end of the table corrects for slight shifting of the pivot axis during turning or warpage of the table. It is easy enough to interpolate between the two needles. As aforesaid if one mechanism is very much out of order this will be quickly indicated by unreasonable separation of the needles. The machine is now ready for grinding and the adjustment is as accurate as the reading to within about a tenth of the increments represented by the divisions on the scale 30 regardless of errors in the screw 11 or for that matter changes of temperature as will presently appear.

Referring now to Figure 1, secured to the left hand end of the table 20 is a bracket 31 and secured to the right hand end of the table 20 is a bracket 32, these brackets being geometrically symmetric. I provide two boxes 33 and 34 which and the arrangement of parts in which are also geometrically symmetric. I shall now describe the parts mostly in connection with Figures 2 and 3 which illustrate the box 33 with the understanding that there are the same parts symmetrically arranged in the box 34 and that except in connection with Figure 7 I may not mention all the parts in the box 34 but that the parts in the box 33 have odd numbers and the corresponding parts in the box 34 where specifically illustrated have the next even numbers.

The bracket 31 is bored and threaded at the end and receives the screw 23. Referring to Figure 3, the screw 23 can contact a rod 37 which is secured to the end of a rod 39 of non-ferrous metal which is secured to a ferrous metal corepiece 41 which is secured to a rod 43 which is secured to a flat spring 45. Between the rods 37 and 39 there is secured a flat spring 47. The flat spring 47 is secured by screws 49 and a plate 51 to a wall 53 of the box 33. The flat spring 45 is secured by screws 55 and a plate 57 to a block 59 which is positioned by the bottom 61 of the box 33 and has a screw threaded bore receiving a non-ferrous metal screw 62 which is secured to a ferrous metal core 63 to which is secured a rod 65. This rod 65 is slidably supported by a bushing 67 in the end of a sleeve 69.

The upper part of the box 33 is bored and threaded and receives a bored plug 73 which clamps in place the three coils 75, 77 and 79 of a linear variable differential transformer which and the other ones of which will be hereinafter referred to as L.V.D.T. The coils 75, 77 and 79 are received in a non-ferrous metal casing 81 and clamped by the bored plug 73. It will now be seen that the L.V.D.T. 41—75—77—79 is operated whenever the screw 23 pushes the rod 37 and that the springs 45 and 47 provide a restoring force because the core is not in the central position when the screw 23 is out of contact with the rod 37.

There is another L.V.D.T. comprising the core 63 and three coils 85, 87 and 89 which are located in the sleeve 69 held in place by the bottom 61 and the block 59. The function of the L.V.D.T. 63—85—87—89, which is connected electrically in opposition to L.V.D.T. 41—75—77—79 as will be described more fully hereinafter, is to stabilize the zero output point of the pickup-unit comprising box 33 and its associated mechanism. Practical L.V.D.T.'s exhibit a finite non-zero null voltage due to slight manufacturing inaccuracies in the winding of the coils, mechanical asymmetry of the core piece and winding forms, imperfect alignment of core and coils, etc. Temperature changes affect the physical dimensions of the core piece, its magnetic permeability and conductivity, and the resistance and inductance of the coil windings, changes in any or all of which may affect the magnitude of the null voltage and the position of the core at which it occurs. Similarly, changes in the excitation voltage applied to the primary winding, as described below, affects the operating point on the induction curve of the core piece, heating of the coils, harmonic generation, etc. These residual effects are significant in L.V.D.T.'s because the output voltage is the difference between induced E.M.F.'s in two secondary coils, said difference being a small fraction of the induced E.M.F. To achieve most stable operation, a second L.V.D.T. 63—85—87—89, preferably having characteristics matching that of the first L.V.D.T. 41—75—77—79, is mounted in physical proximity to, and excited from the same source as the first, with its output connected subtractively in series with that of the first L.V.D.T. to effect a reduction in the new output zero drift arising from those causes which affect both L.V.D.T.'s equally.

Changes in the exciting voltage applied to the primary winding can change the zero or null position and as the operator sets the needles 25 and 26 to the zero position this might, at first blush, seem to be of no consequence. However, if between the time the operator sets the needles 25 and 26 to the zero position and the time he turns the sleeve 10 to correct the adjustment, there is a change in the exciting voltage, it can produce an error were it not for the second L.V.D.T. It is well known that voltages on power lines can fluctuate within considerable limits dependent upon the load upon the line and at any second the closing of a switch somewhere in the system to double the load on the line might occur changing the exciting voltage. Furthermore if there were no second L.V.D.T. to counterbalance such changes the operator, seeing the needles 25 and 26 move during the course of a machining operation which might take a good many minutes, might conclude that the clamping screws 93, which secure the table 20 to the carriage 13 and which are preferably provided to keep loads off the micrometer mechanism, had slipped. With the second L.V.D.T's in accordance with the preferred embodiment of this invention the operator can watch the needles 25 and 26 to be sure that the clamping screws have not slipped.

On the other hand, for applications where the sensitivity requirements are less stringent, inherent drift of the first L.V.D.T. may have only a trivial influence on the indications of the meter, in which case the second, compensating, L.V.D.T. may be omitted. It is assumed in the balance of this description that wherever the second L.V.D.T. is included it is only by way of illustration and it may, for many practical embodiments, be left out of the apparatus.

The L.V.D.T's are connected to the electronic mechanism by cables 99 and 100, indicated in Figure 1. Figure 4 illustrates the mechanical features of the cable connection where the cable 100 is located in an insulating bushing 102 held in place by a threaded sleeve 104 screwed into a boss 106 of the front wall of the box 34. It is believed that the foregoing description together with the drawings amply explains the mechanical features of the actuating L.V.D.T's and associated parts which mechanical features can be widely varied, and I will now describe the electrical and electronic features of Figure 7 including also the meters of Figures 5 and 6. Where nonferrous parts were mentioned other low permeability material could be used and "ferrous" is to be deemed to mean any material satisfactorily permeable.

Referring now to Figure 7, the L.V.D.T. 41 and so forth and the L.V.D.T. 63 and so forth, whose secondary windings 75—79 and 85—89 are subtractively connected as hereinbefore explained, provide the signal input to A.C. amplifier 111, said signal voltage being proportional to the excitation current supplied to primary windings 77 and 87 from oscillator 114 and to the displacement relative to its null position of core 41. The output signal from A.C. amplifier 111 is the signal input to phase sensitive detector 115, a phase reference carrier voltage being supplied to phase sensitive detector 115 from oscillator 114. The output voltage of phase sensitive detector 115 is linearly proportional to the component of the input signal to A.C. amplifier 111 in phase with the reference voltage applied to phase sensitive detector 115. Said output voltage is connected to indicating meter 120, and more specifically to terminals 121 and 123 as shown in Figure 12, these terminals being internally connected to the moving coil 125, see Figure 5, of a D'Arsonval direct current meter whose indicating pointer is needle 25.

The amplification or gain of A.C. amplifier 111 is adjusted to a suitable value so that movement of needle 25 from center scale to full scale represents a useful range of taper adjustment, such as .010″ per foot.

When core piece 41 moves in one direction from its null position the phase polarity of the output signal from the assembly of L.V.D.T. 41 and so forth and L.V.D.T. 63 and so forth is 180° shifted relative to the phase polarity of said output signal when the displacement of core piece 41 is in the opposite direction relative to its null position. Phase sensitive detector 115 responds to this phase reversal by reversal of the polarity of its output voltage; consequently needle 25 moves up-scale for one direction of motion of core piece 41, and down-scale for the other. The particular direction of motion of needle 25 with respect to a given direction of motion of core piece 41 may be reversed by interchanging any pair of conductors, for example the signal input leads to A.C. amplifier 111, the signal input leads to phase sensitive detector 115, the output leads from phase sensitive detector 115 to meter 120, the leads from oscillator 114 to phase sensitive detector 115, or the excitation leads from oscillator 114 to the assembly comprising L.V.D.T. 41 and so forth and L.V.D.T. 63 and so forth. Thus needle 25 responds to relative motion between table 20 and carriage 13 as manifested by movement of screw 23 relative to box 33 at the left end of Figure 1.

In like manner a similar pick-up assembly comprising screw 24, box 34 and associated brackets and cables, shown at the right-hand end of Figure 1, is connected, as shown in Figure 7, in a circuit comprising L.V.D.T. 42 and so forth and L.V.D.T. 64 and so forth, A.C. amplifier 112, phase sensitive detector 116, meter terminals 122 and 124, coil 126 (these latter three items being shown in Figure 6), and ultimately to needle 26 of meter 120, needle 26 being responsive to the relative displacement of core piece 42 from its null position in exactly the same manner as needle 25 is responsive to the relative displacement of core piece 41 from its null position.

Referring to Figures 1 and 7, it may be seen that as table 20 pivots about pivot point 19 in a clockwise direction core piece 41 of pick-up box 33 is moved inwardly relative to box 33, while core piece 42 of pick-up box 34 moves at the same time outwardly relative to box 34. However, needles 25 and 26 are caused to move in the same direction relative to the scale of meter 120 by a simple interchange of leads as described above.

Power supply 130 furnishes the necessary low voltage A.C. and high voltage D.C. potentials required for operation of the various amplifier detector and oscillator circuits. The connections between the L.V.D.T's and the amplifiers, the connections between the amplifier and the phase sensitive detectors, the connections between the latter and the separate instrumentalities of the meter, as well as the connections between the oscillator to the phase sensitive detectors on one side and to the L.V.D.T's on the other side are conductor pairs in this illustrative embodiment of the invention, and the input to the power supply can also be a conductor pair but since the amplifiers and the oscillator need to be fed with D.C. as well as A.C. single lines in the diagram represent as many wires as are necessary to achieve this purpose all as well known in the art.

Whereas the above discussion commenced with the assumption that only screws 23 and 24 required adjustment to zero the indicating pointers, I provide (see Figures 1 and 4) arcuate tracks 141 and 142 on blocks 145 and 146, which are attached to carriage 13 by bolts 150, to which pickup units 33 and 34 are secured by set-screws 152. Loosening set-screws 150 permits the operator to adjust the gross position of pickups 33 and 34 so that knurled adjusting screws 23 and 24 contact buttons 37 and 38 when in their mid-position more or less.

With a single pickup represented, for example, by the unit in the box 33 and cooperating parts, the correction made by the fine setting would not allow for elastic deflection of the table 12 due to dragging forces exerted upon it by carriage 13 which it rests on. However, with two pickups, the average angular displacement, estimated by the operator as the value mid-way between the positions of the two indicating pointers 25 and 26, is the taper angle change relative to a chordal line connecting the ends of swivel table 12. Thus for work mounted in such a way that its axis parallels said chordal line (e.g. on centers equidistant from the pivot), this average indication measures the true taper change independent of table deflection. Similarly, the two pickup system reduces errors introduced by backlash or looseness in pivot 19.

A further advantage of the present system of having two separate indicating needles to show displacements of each end of the swivel table is that the operator is thereby given additional information regarding the condition of alignment of the table. For example, if the increments of adjustment are made by turning micrometer barrel 10 in one direction only then pivot backlash is automatically eliminated and a separation of needles 25 and 26 shows the degree of deflection of the swivel table itself. In certain classes of work, for example when using a chuck on the headstock spindle with the headstock positioned far from the pivot 19, table deflection throws the work center line out of parallelism with the chordal line discussed above. Thus even a double pickup gives a false indication of taper angle change unless there is no change in table deflection. The operator is quickly appraised of these deflections by separation of the needles of this invention, and therefore can take remedial action, such as lightly tapping the appropriate end of the table to shake out its elastic deformation.

I shall now deal with the second disclosure of Figures 8 to 13 inclusive. The same assumption about adjustment in one setting applies. Referring now to Figures 8, 9 and 10, having mounted the workpiece in a chuck 200, the operator turns the headstock 201 to give the required taper as indicated on a scale 202 as compared with a lubber line. The headstock 201 can be turned by hand, for example by tapping some part of it with a lead hammer. The operator then grinds the workpiece and with micrometer calipers actually measures the taper. He then knows that the preliminary setting is in error by just so much.

The operator now loosens a set screw 205 thus loosening a ring 206 carrying an arm 207 through which extends a knurled screw 210 he then moves the ring until the screw 210 contacts a rod 211. He then secures the ring 206 by tightening the screws 205 and then turns the knurled screw 210 to zero the needle 215 of the meter shown in Figure 13 and conveniently the zero position is straight up or in the middle of the dial 220 of Figure 13. The operator now knows that the electronic apparatus is set so that he can make the correction as indicated on the dial by the needle 215.

The operator then turns the headstock 201 until the needle 215 has moved the right number of divisions on the dial 220 in the proper direction. I like an arrangement in which moving the headstock clockwise moves the needle 215 clockwise. The operator now tightens the holding nuts 225 to clamp the headstock 201 in position and the machine is now ready for grinding. The adjustment is as accurate as the reading to within about a tenth of the increments represented by the divisions on the scale 30 regardless of errors in the scale 202.

Referring now to Figures 8, 9 and 10, the headstock 201 has a slide 230 by which it is mounted on the machine base 231 and on which it can be located in various desired positions. Secured to the slide 230 in any desired manner is a box 233 containing mechanism similar to that described in connection with Figure 3. The rod 211 is secured to the end of a rod 239 of non-ferrous metal which is secured to a ferrous metal core piece 241 which is secured to a rod 243 which is secured to a flat spring 245. Between the rods 211 and 239 there is secured a flat spring 247. The flat spring 247 is secured by screws 249 and a plate 251 to a wall 253 of the box 233. The flat spring 245 is secured by screws 255 and a plate 257 to a block 259 which is positioned by the bottom 261 of the box 233 and has a screw threaded bore receiving a non-ferrous metal screw 262 which is secured to a ferrous metal core 263 to which is secured a rod 265. This rod 265 is slidably supported by a bushing 267 in the end of a sleeve 269.

The upper part of the box 233 is bored and threaded and receives a bored plug 273 which clamps in place the three coils 275, 277 and 279 of an L.V.D.T. (linear variable differential transformer). The coils 275, 277 and 279 are received in a non-ferrous metal casing 281 and clamped by the bored plug 273. It will now be seen that the L.V.D.T. 241—275—277—279 is operated whenever the screw 210 pushes the rod 211 and that the springs 245 and 247 provide a restoring force because the core is not in a central position when the screw 210 is out of contact with the rod 211.

There is another L.V.D.T. comprising the core 263 and three coils 285, 287 and 289 which are located in the sleeve 269 held in place by the bottom 261 and the block 259. The function of L.V.D.T. 263 etc. which is connected electrically in opposition to L.V.D.T. 241 etc. as will be described more fully hereinafter, is to stabilize the zero output point of the pickup-unit comprising box 233 and its associated mechanism. Practical L.V.D.T.'s exhibit a finite non-zero null voltage due to slight manufacturing inaccuracies in the winding of the coils, mechanical asymmetry of the core piece and winding forms, imperfect alignment of core and coils, etc. Temperature changes affect the physical dimensions of the core piece, its magnetic permeability and conductivity, and the resistance and inductance of the coil windings, changes in any or all of which may affect the magnitude of the null voltage and the position of the core at which it occurs. Similarly, changes in the excitation voltage applied to the primary winding, as described below, affects the operating point on the induction curve of the core piece, heating of the coils, harmonic generation, etc. These residual effects are significant in L.V.D.T.'s because the output voltage is the difference between induced E.M.F.'s in two secondary coils, said difference being a small fraction of the induced E.M.F. To achieve most stable operation, a second L.V.D.T. 263 etc., preferably having characteristics matching that of the first L.V.D.T. 241 etc., is mounted in physical proximity to, and excited from the same source as the first, with its output connected subtractively in series with that of the first L.V.D.T. to effect a reduction in the new output zero drift arising from those causes which affect both L.V.D.T.'s equally.

Changes in the exciting voltage applied to the primary winding can change the zero or null position and as the operator sets the needle 215 to the zero position this might, at first blush, seem to be of no consequence. However, if between the time the operator sets the needle 215 to the zero position and the time he turns the headstock 201 to the corrected position, there is a change in the exciting voltage, it can produce an error were it not for the second L.V.D.T. It is well known that voltages on power lines can fluctuate within considerable limits dependent upon the load upon the line and at any second the closing of a switch somewhere in the system to double the load on the line might occur changing the exciting voltage. Furthermore if there were no second L.V.D.T. to counterbalance such changes the operator, seeing the needle 215 move during the course of a machining operation which might take a good many minutes, might conclude that the clamping screws 225, which secure the headstock 201 to the slide 230 and which are preferably provided to keep loads off the micrometer mechanism, had slipped. With the second L.V.D.T. in accordance with the preferred embodiment of this invention the operator can watch the needle 215 to be sure that the clamping screws have not slipped.

On the other hand, for applications where the sensitivity requirements are less stringent, inherent drift of the first L.V.D.T. may have only a trivial influence on the indications of the meter, in which case the second, compensating L.V.D.T. may be omitted. It is assumed in the balance of this description that wherever the second L.V.D.T. is included it is only by way of illustration and it may, for many practical embodiments, be left out of the apparatus.

The L.V.D.T.'s are connected to the electronic mechanism by a cable 300, indicated in Figure 8. Figure 10 illustrates the mechanical features of the cable connection where the cable 300 is located in an insulating bushing 302 held in place by a threaded sleeve 304 screwed into a boss 306 of the front wall of the box 233. It is believed that the foregoing description together with the drawings amply explains the mechanical features of the actuating L.V.D.T.'s and associated parts which mechanical features can be widely varied, and I will now describe the electrical and electronic features of Figure 13 including also the meters of Figures 11 and 12. Where non-ferrous parts were mentioned other low permeability material could be used and "ferrous" is to be deemed to mean any material satisfactorily permeable.

Referring now to Figure 13, the L.V.D.T. 241 etc. and the L.V.D.T. 263 etc., whose secondary windings 275—279 and 285—289 are subtractively connected as hereinbefore explained, provide the signal input to A.C. amplifier 311, said signal voltage being proportional to the excitation current supplied to primary windings 277 and 287 from oscillator 314 and to the displacement relative to its null position of core 241. The output signal from A.C. amplifier 311 is the signal input to phase sensitive detector 315, a phase reference carrier voltage being supplied to phase sensitive detector 315 from oscillator 314. The output voltage of phase sensitive detector 315 is linearly proportional to the component of the input signal to A.C. amplifier 311 in phase with the reference voltage applied to phase sensitive detector 315. Said output voltage is connected to indicating meter 220, and more specifically to terminals 321 and 323 as shown in Figure 12, these terminals being internally connected to the moving coil 325, see Figure 11, of a D'Arsonval direct current meter whose indicating pointer is needle 215.

The amplification or gain of A.C. amplifier 311 is adjusted to a suitable value so that movement of needle 215 from center scale to full scale represents a useful range of taper adjustment, such as .010" per foot.

When core piece 241 moves in one direction from its null position the phase polarity of the output signal from the assembly of L.V.D.T. 241 etc. and L.V.D.T. 263 etc. is 180° shifted relative to the phase polarity of said output signal when the displacement of core piece 241 is in the opposite direction relative to its null position. Phase sensitive detector 315 responds to this phase reversal by reversal of the polarity of its output voltage; consequently needle 215 moves up-scale for one direction of motion of core piece 241, and down-scale for the other. The particular direction of motion of needle 215 with respect to a given direction of motion of core piece 241 may be reversed by interchanging any pair of conductors, for example the signal input leads to A.C. amplifier 311, the signal input leads to phase sensitive detector 315, the output leads from phase sensitive detector 315 to meter 220, the leads from oscillator 314 to phase sensitive detector 315, or the excitation leads from oscillator 314 to the assembly comprising L.V.D.T. 241 etc. and L.V.D.T. 263 etc. Thus needle 215 responds to relative motion between headstock 201 and slide 230.

Power supply 330 furnishes the necessary low voltage A.C. and high voltage D.C. potentials required for operation of the various amplifier detector and oscillator circuits. The connections between the L.V.D.T.'s and the amplifiers, the connections between the amplifier and the phase sensitive detectors, the connections between the latter and the separate instrumentalities of the meter, as well as the connections between the oscillator to the phase sensitive detectors on one side and to the L.V.D.T.'s on the other side are conductor pairs in this illustrative embodiment of the invention, and the input to the power supply can also be a conductor pair but since the amplifiers and the oscillator need to be fed with D.C. as well as A.C. single lines in the diagram represent as many wires as are necessary to achieve this purpose all as well known in the art.

A linear variable differential transformer is one example of alternating current bidirectional suppressed carrier electro-mechanical modulation means comprising two relatively movable elements. Other examples of alternating current bidirectional suppressed carrier electromechanical modulation means comprising two relatively movable elements for use either with a single unit or a pair of units or two pairs of units in accordance with this invention and connected as described herein are:

(1) Differential capacitor bridge modulators;
(2) Strain gauge bridge modulators;
(3) Reluctance bridge modulators;
(4) A.C. excited differential photo-electric modulators; and
(5) Rotating electric machines, commonly called resolvers, with A.C. excitation applied to one rotor winding (or to one stator winding) and the signal output taken from one stator winding (or from one rotor winding if stator is excited).

These may be substituted for the L.V.D.T. in a manner which will be apparent to those skilled in the art.

In certain of the claims the meter 120 is treated as a pair of meters which it really is being a pair of meters located in one box. However, where it is referred to in the singular a single meter is included within the scope of the claim.

Although the title is electronic swivel control it will readily be appreciated that the element controlled could be rectilinearly movable. Applications include the adjustment of a lathe tool slide in the direction of the axis of the workpiece for accurately cutting off pieces to the required length and the procedure can be as hereinbefore indicated, first making a trial piece, then calipering it, then resetting to get the desired result within high precision limits.

It will thus be seen that there has been provided by this invention an electronic swivel control which, however, can also be used for accurate setting of rectilinearly movable elements, in accordance with which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. Electronic angular setting mechanism comprising two members, pivoting means connecting said members so that one thereof can be set at various angles to the other thereof, two sets of alternating current bidirectional suppressed carrier electromechanical modulation means each having two relatively movable elements, one element of each set being attached to one member at points spaced from said pivoting means, two setting means one for each of the other elements of the sets attached to the other member at points adjacent the first named points and spaced from said pivoting means, precision means to move one of said members angularly relative to the other one, two amplifiers one for each of said sets, two phase sensitive detectors one for each of said sets connected to the amplifiers, an oscillator coupled to transmit power to said sets and to said phase sensitive detectors, and a pair of meters coupled to said phase sensitive detectors respectively to indicate the angular movement of one member relative to the other member, whereby small errors of the pivoting means and small changes of shape of the member that moves are nullified by having two sets and two setting means, and an operator can move one member relative to the other by the precision means to get a selected angle then measure the error of the angle achieved, then zero the needles on the scale by moving the setting means, then move one member on the other again by the precision means and correct the error by moving them to read the error on the scale in the direction of correcting it.

2. Electronic angular setting mechanism according to claim 1 having in each set of alternating current bidirectional suppressed carrier electromechanical modulation means a second one thereof reverse connected to the first one in series and connected to its amplifier and having elements fixed relative to each other, whereby to compensate for line voltage changes, temperature changes and the like.

3. Electronic angular setting mechanism according to claim 2 in which the alternating current bidirectional suppressed carrier electromechanical modulation means are linear variable differential transformers.

4. Electronic angular setting mechanism according to claim 1 in which the alternating current bidirectional suppressed carrier electromechanical modulation means are linear variable differential transformers.

5. Electronic setting mechanism comprising two members mounted for relative movement, a first alternating current bidirectional suppressed carrier electromechanical modulation means having two relatively movable elements, one element being attached to one member, a setting means for the other element attached to the other member, precision means to move one of said members relative to the other one, an amplifier for the first modulation means, a phase sensitive detector for the first modulation means connected to the amplifier, an oscillator coupled to transmit power to the first modulation means and to the phase sensitive detector, a meter having a needle coupled to the phase sensitive detector to indicate the movement of one member relative to the other one, whereby an operator can move one member relative to the other by the precision means to get a given relative position of the members, then measure the error of the position, then zero the needle by moving the setting means, then move one member relative to the other again by the precision means and correct the error by moving the needle to read the error in the direction of correcting it, and a second alternating current bidirectional suppressed carrier electromechanical modulation means reversed connected in series to the first one and connected to the amplifier and having elements fixed relative to each other, whereby to compensate for line voltage changes, temperature changes and the like.

6. Electronic setting mechanism according to claim 5 in which the alternating current bidirectional suppressed carrier electromechanical modulation means are linear variable differential transformers.

References Cited in the file of this patent

UNITED STATES PATENTS

| | | |
|---|---|---|
| 1,114,362 | Huttenlocher | Oct. 29, 1914 |
| 2,050,446 | Meyer | Aug. 11, 1936 |
| 2,050,629 | Quereau | Aug. 11, 1936 |
| 2,058,518 | Schuster | Oct. 27, 1936 |
| 2,330,427 | Hornfeck | Sept. 28, 1943 |
| 2,408,524 | Mestas | Oct. 1, 1946 |
| 2,595,604 | Pascoe | May 6, 1952 |
| 2,627,119 | Graham | Feb. 3, 1953 |
| 2,631,272 | Smith | Mar. 10, 1953 |